Figure 1:
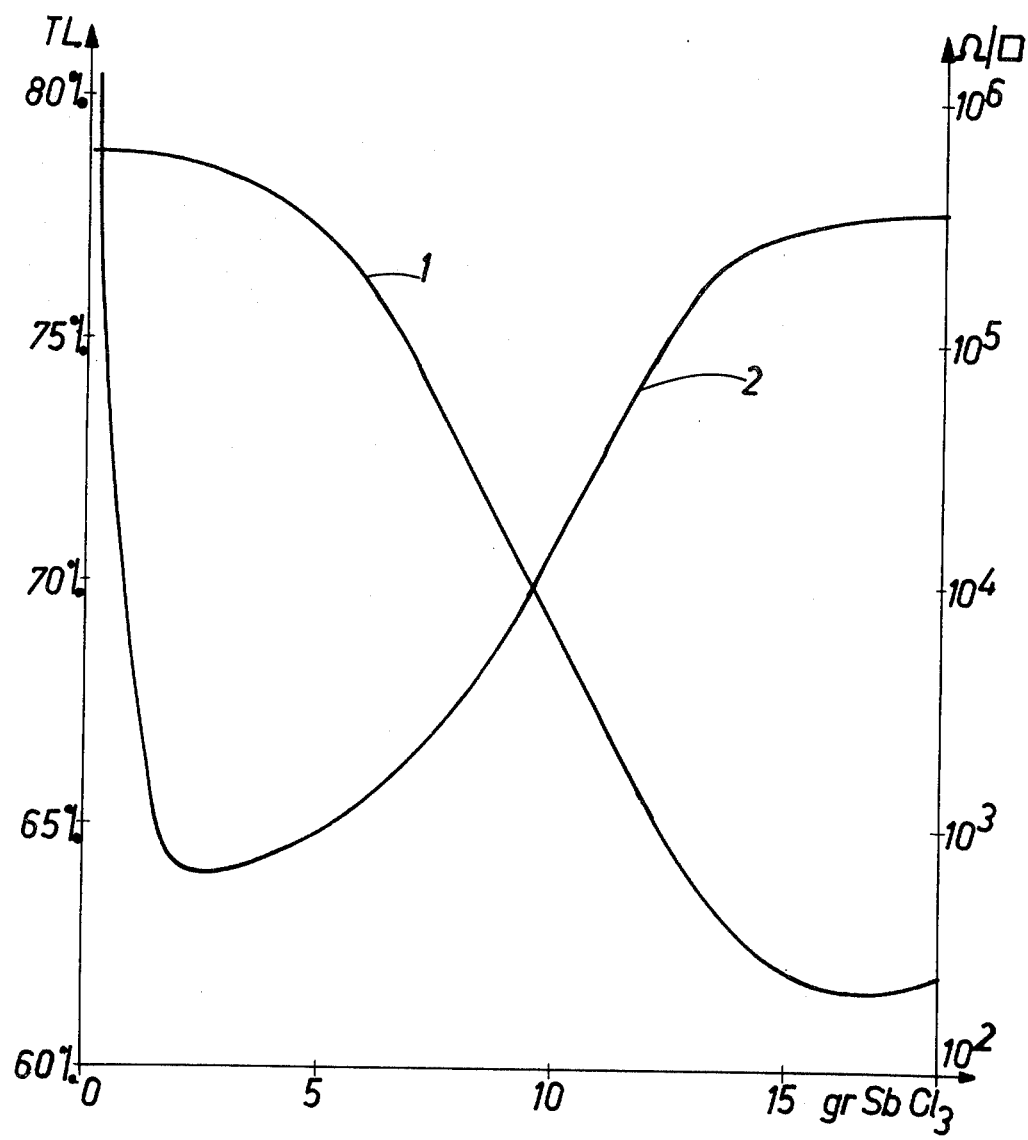

United States Patent [19]
Plumat et al.

[11] 3,984,591
[45] Oct. 5, 1976

[54] PROCESS FOR FORMING A METALLIC OXIDE COATING

[75] Inventors: Emile Plumat, Gilly; Robert Posset, Mont-sur-Marchienne, both of Belgium

[73] Assignee: Glaverbel-Mecaniver S.A., Watermael-Boitsfort, Belgium

[22] Filed: Dec. 19, 1973

[21] Appl. No.: 426,343

[30] Foreign Application Priority Data
Dec. 21, 1972  Luxemburg.............................. 66730

[52] U.S. Cl. ................................. 427/165; 65/60 C; 65/60 D; 427/168; 427/314; 427/422; 427/427; 350/1
[51] Int. Cl.² ..................... B32D 17/06; G02B 5/20; C03C 17/22
[58] Field of Search ................. 65/60; 117/33.3, 54, 117/124 A, 124 B, 160 R, 169 R; 427/165, 168, 422, 427, 314; 350/1

[56] References Cited
UNITED STATES PATENTS

| | | |
|---|---|---|
| 3,107,177 | 10/1963 | Saunders et al. ............... 117/124 X |
| 3,519,467 | 7/1970 | Plumat et al........................... 117/54 |
| 3,652,246 | 3/1972 | Michelotti et al. .............. 117/124 A |
| 3,705,054 | 12/1972 | Matsushita et al.............. 117/124 X |
| 3,711,322 | 1/1973 | Kushihashi...................... 117/124 A |
| 3,754,975 | 8/1973 | Spiller............................. 117/124 X |
| 3,850,665 | 11/1974 | Plumat et al....................... 117/33.3 |

Primary Examiner—Michael R. Lusignan
Attorney, Agent, or Firm—Edmund M. Jaskiewicz

[57] ABSTRACT

A metallic oxide coating is formed on a substrate which may be vitreous, partially vitreous or nonvitreous by applying to the substrate a solution of one or more metallic salts selected from the group of the acetates, halides and nitrates in an aprotic solvent having a dielectric constant greater than 15 and a dipolar moment greater then 3D. The substrate and applied solution are then subjected to heat to convert in situ the metallic salt to form a coating comprising at least one metallic oxide.

20 Claims, 1 Drawing Figure

PROCESS FOR FORMING A METALLIC OXIDE COATING

The present invention relates to a method of forming a metallic oxide coating on a substrate, more particularly, to such a process wherein a solution comprising at least one metallic compound is applied to the substrate and the compound or compounds is/are converted in situ by the action of heat so as to form a coating comprising at least one metallic oxide and the article formed thereby.

It is well known to make oxide coatings, such as cobalt oxide coatings, by spraying an aqueous solution of a hydrated metallic salt, for example an aqueous solution of $CoCl_2.6H_2O$ or $FeCl_3.6H_2O$, on to the surface of a substrate which is heated to a temperature high enough to result in conversion of the metallic salt in situ. When the coating is formed by this method it is usually, however, of poor quality, particularly with respect to the degree of uniformity of the thickness and the composition of the coating. For example, when such an aqueous cobalt salt solution is applied, the result is equivalent to a granular deposit of irregular thickness and, usually, the coating has very poor adherence to the substrate. Coatings formed in this way are readily removed in the form of dust, simply by passing a finger over the coating or by applying a piece of adhesive tape onto the coating and then peeling the tape away.

One of the objects of the present invention is to provide a novel and improved method for producing metallic oxide coatings of uniform thickness and composition on various substrates.

It is another object of the invention to provide a method whereby metallic oxide coatings having a high degree of uniformity can be formed on the surface of at least partially vitreous substrates, so that the method can be used for forming optical films on vitreous bodies or articles, for example glazing sheets, windscreens, patterned glass and lenses for sunglasses.

A further object of the invention is to provide a method whereby metallic oxide coatings can be produced which have antistatic or electrically conductive properties.

According to one aspect of the present invention there is provided a method of forming a metallic oxide coating on a substrate, in which method a solution comprising at least one metallic compound is applied to the substrate and the said compound or compounds is/are converted in situ by the action of heat so as to form a coating comprising at least one metallic oxide. The solution used to form the coating on the substrate is a solution of one or more metallic salts selected from the group of acetates, halides and nitrates in an aprotic solvent having a dielectric constant greater than 15 and a dipolar moment greater than 3D (D = Debye unit).

By means of the method according to the invention it is possible to produce metallic oxide coatings whose thickness and composition are substantially uniform. This is essential, for example, in the case of very thin light-transmission coatings and in the case of coatings which are required to have a definite electric resistance.

The method is therefore suitable for forming optical films on vitreous bodies or articles so as to modify their light transmission and/or their light reflection properties, for example, in order to give the said bodies or articles a tinted appearance when viewed by transmitted or reflected light. The method is also very important for forming anti-static or conductive films on substrates of a nonconductive material.

The coating uniformity resulting from the invention is due not only to the choice of the metallic salt but also to the selection of the solvent.

The metal salt solutions used in carrying out the invention may be obtained at very low cost and enable metallic oxide coatings to be produced very profitably on an industrial scale. The metallic salt solutions can moreover be relatively concentrated and this is advantageous particularly when the solution is required to be applied to a substrate which is moving fairly rapidly with respect to a coating station. Another important factor is the safety with which such solvents can be used under very high temperature conditions. It is therefore possible to heat and evaporate the solvent very rapidly and obtain a rapid conversion of the metallic compound or compounds, and this is also an important factor in the formation of coatings of uniform density.

The method can be used for obtaining a wide range of properties pertaining to the applied coating, by appropriate selection of the metal salts. The applied solution may contain a single metal salt or a mixture of two or more metal salts. There is thus a great flexibility in the method for producing coatings which have definite optical or electrical characteristics. For example, it is possible to produce coatings composed of cobalt, iron and chromic oxides, by using a solution comprising cobalt acetate, ferric chloride and chromium nitrate.

Preferably, the substrate is preheated to a temperature high enough to provide the heat required to produce the said conversion of the metallic compound or compounds.

Preheating of the substate results in evaporation of the solvent and conversion of the metallic compound or compounds immediately, i.e., as soon as the solution comes into contact with the substrate. Rapid conversion promotes uniformity of the coating.

Other objects and advantages of the present invention will be apparent upon reference to the accompanying description when taken in conjunction with the following drawing, which is exemplary, and which is a graph comprising two curves illustrating the result obtained from a specific embodiment of the invention.

Generally, in order to achieve the purposes primarily in view, the optimum temperature of the substrate when the coating process is carried out is in the range 300° to 700°C. The temperature is preferably selected so as to be as high as possible consistent with avoiding any risk of damage to the substrate. When coating vitreous substrates, it is recommended to work in the temperature range 450° to 650°C. With a temperature between these limits, very uniform coatings are obtained together with very good adherence of the coating to vitreous substrates, such adherence also being influenced by the temperature of the substrate at the moment the coating solution is applied.

The metal salt solution is preferably applied in the form of droplets. The required results are obtained most readily by applying the solution in such form. For example, an internal mix type spray gun may be used, which is fed with compressed air and salt solution separately, both at the same pressure, above atmospheric pressure. The salt solution itself may be at ambient temperature or at a higher temperature, provided that there is no undesirable premature evaporation of the solvent and no decomposition and oxidation of the metallic compound or compounds and provided that the substrate is not exposed to harmful thermal shock.

It is believed that the results attained by the method according to the invention are due in part to the selection of an aprotic solvent having a dielectric constant greater than 15 and a dipolar moment greater than 3D. Examples of aprotic solvents having such properties are the following: dimethylformamide, dimethylacetamide, tetramethyl urea, dimethylsulphoxide, acetonitrile, nitrobenzene, ethylene carbonate, tetramethylene sulphone, hexamethylphosphoramide.

One may classify the solvents as "protic" (or acid) and "aprotic" (or basic) solvents. Protic solvents are hydrogendonors. Solvents having a dielectric constant higher than 15, although they may contain hydrogen atoms, unable to form strong bonds, may also be called "dipolar aprotic solvents" (cfr. PARKER, A. J. "The effects of solvation on the properties of anions in dipolar aprotic solvents" Quarterly Reviews, 16, p. 163 (1962).

Special preference is given to dimethylformamide. This solvent is particularly suitable for most of the metallic salts in question, so that these compounds may be applied in relatively high concentrations, which means that the speed of application of the solution to a given zone of the surface of a substrate can be relatively low to produce a coating of given thickness. Dimethylformamide can also be used to apply coatings to substrates at very high temperatures without the risk of fire or explosion.

Preference is given to embodiments of the invention wherein the solution which is applied to the substrate comprises one or more acetates, halides or nitrates of a metal or metals selected from the following group: Mg, Zr, V, Cr, W, Mn, Fe, Co, Ni, Cu, Zn, Cd, In, Sn, Pb, Bi, Th, Si.

It is advantageous to use in mixture with one or more of the said salts, one or more acetates, halides or nitrates of a metal or metals selected from the group: Au, Ti, Ce, Mo, Sb, Al, As, Rh.

It should be noted that the coating formed on the substrate is not necessarily formed exclusively by a metal oxide or by metallic oxides, but may also contain an element, for example gold, in the metallic state. Generally, all the above-mentioned salts may be used in mixture with the selected solvent or solvents without any special precautions except those well known to those versed in the art which are intended to obviate undesirable redox or hydrolysis reactions in the solution.

When such solutions are used, it is possible to form thin very high-quality metallic oxide coatings which modify the light reflection and transmission of the substrate, and metallic oxides which adhere perfectly to ceramic substrates and to glass and partially vitreous e.g., vitrocrystalline or vitroceramic substrates, which are the materials primarily requiring an optical coating. It is also possible to form thin metallic oxide coatings of a controlled electrical resistance satisfying given specifications. In this latter case, the coatings are applied preferably to non-conductive substrates such as glasses, ceramics, and vitrocrystalline or vitroceramic materials.

Advantageously, acetylacetone is also present in the applied salt solution. The presence of acetylacetone is generally particularly advantageous when applying a solution of one or more halides or nitrates. The acetylacetone enables optimum solution filmability to be obtained and makes possible a better pyrolysis of the metallic compounds.

For example, it is possible to obtain coatings of improved optical quality by adding acetylacetone to solutions comprising vanadium chloride, chromium nitrate, iron or nickel nitrate, or indium nitrate.

In some cases, the presence of acetylacetone ensures better safety on preparation of the film-forming solution. If, for example, it is required to prepare a solution of anhydrous $SnCl_4$ in dimethylformamide, it is preferable first to mix the stannic chloride with acetylacetone and to pour the resulting liquid in the selected solvent to prevent the latter from igniting.

It has been found that when acetylacetone is used it is preferable to use proportions such that the amount of acetyl-acetone used is of the order of $n$ times the number of moles of metallic salt used (where $n$ represents the valency or the aggregate of the valencies of the metallic cation(s)).

The invention is particularly important for forming metallic oxide coatings on vitreous and partially vitreous substrates, such as substrates of vitrocrystalline or vitroceramic material. This is due to the fact that the method enables thin metallic oxide coatings to be formed which are highly uniform both in thickness and density. These are properties which are specially desirable for optical, antistatic or conductive films serving to modify the optical and/or dielectric properties of bodies or articles to which the said coatings are applied.

Vitreous or partially vitreous bodies or articles of any shape can be coated by means of the method to give them a predetermined tint and particularly special light reflection characteristics or to give them desired antistatic or conductive properties. It is very advantageous for forming coatings on entirely vitreous transparent bodies and articles, for example windscreens or glazing sheets, because the method enables metallic oxide coatings to be formed which give the article or body various tints as viewed both by transmitted and by reflected light. The method has not only been found suitable for forming a metallic oxide coating directly on a glass or on a surface of partially vitreous material, but also for forming such a metallic oxide coating on an already formed coating film which is adherent to the vitreous substrate, more particularly on an existing metallic oxide coating film such as, for example, a film of titanium oxide or copper oxide.

The metallic oxide coating thickness selected in each given case will depend on the function that the coating is required to perform and may vary, for example, in a range of from some hundred to some thousands of Angstroms. A coating of a given thickness may, if necessary or desirable, be formed from two or more successive layers. The thickness of a coating is best measured by interferometry, although it is also possible to dissolve the coating, analytically determine the weight of the coating per unit of area, and calculate the thickness, taking into account the known density of the oxide and its degree of compaction as a thin film.

The method may be performed particularly economically in the formation of a coating film on flat glass, by spraying the solution onto a continuous ribbon of glass in course of its production, for example at a coating station located in the drawing chamber of a glass drawing machine or in an annealing gallery. The solution is preferably applied where the glass is at temperature within the range 300° to 700°C, preferably between 450° to 650°C, as indicated above. The spray of coating solution is directed perpendicularly to the glass ribbon, and the device is reciprocated transversely of the direction of advance of the ribbon past the coating station. The method may also be performed by spraying the solution on patterned glass during its production in the form of a continuous ribbon. Such a glass moves at a relatively higher speed than flat glass, but this presents no difficulty since the prepared solution may be sufficiently concentrated to produce the coating within the time limits imposed by the method of forming the glass.

When a mixture of two or more salts is used, the proportions of the different salts can be adjusted to control the properties of the coating, for example to control the tint of the coating by transmitted and/or by reflected light, or to control its electrical resistance.

It is often desirable to use the metallic acetates, halides or nitrates in the perfectly crystalline form. For example, one or more hydrated acetates can be used, such as bivalent cobalt acetate which crystallizes with four molecules of water, or anhydrous acetates such as zinc acetate, unless a disturbing precipitate will involve wastage of coating material.

To obtain films of selected tints as viewed by transmitted and reflected light, it is possible to use mixtures of a plurality of acetates, halides or nitrates dissolved in one or more aprotic solvents having a dielectric constant greater than 15 and a dipolar moment greater than 3D. For example, use can be made of mixtures of salts of cobalt, iron and chromium for obtaining coatings which have a bronze tint when viewed by transmitted light and which, moreover, have good resistance to external conditions even in the presence of an acid.

An advantageous application of the method is the coating of an athermanous glass with a highly reflecting coating without substantially increasing the energy absorption.

The light and energy transmission of a coating of given thickness may be increased without substantially modifying the light or energy reflection, by using suitably selected metallic compounds such as, for example, one or more acetates, nitrates or halides of one or more metals of the group: aluminium, zinc, thorium, cerium, tin and magnesium.

Generally, the presence of water in a relatively high quantity in the film-forming solution is acceptable, but preferably it will not exceed 10% by volume. If the amount of water is excessive, the resulting coating may have very small dark stains which are often referred to as "pitting". It should, however, be noted that the extent to which such defects are visually perceptible if at all, in practice depends partly on a number of other factors and, in particular, the composition and the geometry of the coated surface and the thickness of the coating. The said defects are less perceptible on patterned glass of which the motif is highly compact, on reinforced glass (glass in which wire netting has been incorporated), on profiled or shaped sections of glass, for example in the form of a U, and on certain vitrocrystalline materials, than on flat glass having plane surfaces.

Even when the coating is applied to flat glass, such defects tend to be less apparent as the thickness of the coating becomes greater. On the other hand, the greater the thickness of the coating, the more the light transmission of the coating is reduced and in cases where this factor is important the optimum thickness of the coating represents a compromise between the absence of defects and the degree of light transmission.

By way of example, a cobalt oxide coating applied to a plane glass surface and having an optical thickness of 500A has a light transmission of 47% and unless the most favorable conditions as herein described are observed in order to produce a defect-free coating, such defects are likely to occur and to be perceptible to the naked eye. If the same solution is applied to form an oxide coating having an optical thickness of 900A, the imperfections are difficult to see if not totally invisible, but the light transmission is only 26%.

The hardness of the coatings produced according to the invention using the preferred compositions is generally high. Most of the glazings thus coated may be used as single glazings with the coated surface exposed to ambient conditions, because such coatings are sufficiently resistant to mechanical damage under conditions of normal use. If required, however, a protective coating, such as a coating of $SnO_2$, $ZrO_2$ or $TiO_2$, may be superposed, for example, on a coloured coating.

To test the hardness and adherence of coatings produced by means of a method according to the invention, it is possible to use a reciprocating friction element having a surface area of 1 $cm^2$ and formed by rubber incorporating corundum particles of a diameter of 75 – 125 microns. The friction element is set in a weighted tube (weight of assembly 100 g) which slides vertically in a support. Constant contact is thus ensured between the friction element and the sample. The friction element assembly is reciprocated by a crank system. The amplitude of the movement is 3 cm and its frequency is one forward and return stroke per second. After some time the resulting wear pattern consists of scratches very close together with undestroyed coating left between them.

In various tests carried out on glasses coated with oxide coatings such as $ZrO_2$, $SnO_2$, $SnO_2$ and $Sb_2O_3$, $TiO_2$, $Co_3O_4$, $Cr_2O_3$, $Y_2O_3$, $ThO_2$, $CeO_2$, $SiO_2$ or a mixture of these oxides, it was found that after 5 minutes 5% of the surface subjected to friction was scratched. At least 1 hour was required for 95% of the surface to be scratched.

According to certain embodiments of the method, a layer containing tin oxide is formed on a substrate. Such a coating is particularly advantageous because tin oxide gives the coating very considerable hardness.

It is possible, for example, to deposit on a glass substrate, coatings consisting essentially of iron oxide containing a small quantity of tin oxide, i.e., for example 90% $Fe_2O_3$ and 10% $SnO_2$, which are colored and can be used for a single glazing, this not being the case with a colored coating consisting solely of iron oxide. A coating of this kind is readily produced by spraying on glass a solution of ferric chloride to which there has been added acetylacetone and anhydrous $SnCl_2$ in dimethylformamide.

The presence of tin oxide in a coating which also contains one or more colored oxides makes it possible to control and dilute the tint as viewed by transmitted and by reflected light.

The presence of tin oxide is also very advantageous when making coatings having antistatic or electrically conductive properties.

To form such coatings, solutions are used which preferably contain one or more tin chlorides which may or may not be anhydrous, i.e., $SnCl_2$, $SnCl_2.2H_2O$, $SnCl_4.5H_2O$ or $SnCl_4$.

To form coatings havinng a required electrical resistance, the thickness and composition thereof are controlled. For example, to produce an antistatic coating on a substrate of vitreous material, it will be preferable to use a coating containing tin oxide with a thickness between 200 and 800 A.

To obtain a resistance equivalent to an antistatic or a conductive coating it is possible to use coatings which contain small quantities of antimony in addition to tin oxide. To obtain a conductive coating it is preferable to use a salt solution containing a stannous salt as the main ingredient for forming the coating.

The invention will be more readily understood and its advantages will be more apparent from the following illustrative and limitative examples:

EXAMPLE 1

A film-forming solution was prepared by dissolving 199g of bivalent cobalt acetate crystallised with 4 molecules of water and 73 g of anhydrous zinc acetate per liter of dimethylformamide as solvent.

The solution contained 65% by weight of oxide CoO and 35% by weight of ZnO.

This solution, the temperature of which is held at 70°C, was then sprayed on a ribbon of glass in course of its continuous production by a drawing process in which the glass ribbon ascended through an annealing gallery, the spraying being carried out at a place where the glass ribbon had a temperature of 590°C.

An internal mix spray gun was used which was fed with the solution and compressed air both at a pressure of 3.5 kg/cm² above atmospheric pressure.

The distance between the mouth of the gun and the sheet of glass was 25 cm. The gun was reciprocated continuously transversely of the direction of advance of the ribbon, the speed of advance being 1.5 m per minute. The reciprocating movement of the gun had a forward and return stroke period of 6 seconds (glass ribbon width: 3 m).

The output of the gun was 12.7 liters of solution per hour, equivalent to a solution flow of 47 cm³ per m² of glass ribbon. The solution was sprayed to give a film of a thickness of 650 A.

After cooling of the glass, an optical film was obtained having a green tint in transmitted light and highly reflective. The characteristics of the resultant product were as follows:

Light transmission 70.5%
Light reflection on coating side 14.8%
Light reflection on glass side 16%
Energy transmission 69.7%
Energy reflection on coating side 13.7%
Energy reflection on glass side 13.9%
Energy absorption of coating side 16.6%
Energy absorption on glass side 16.4%

The film had a uniform thickness and was free from pitting.

A similar result was obtained by replacing the dimethylformamide by another solvent such as dimethylacetamide, tetramethyl urea, dimethylsuphoxide, acetonitrile, nitrobenzene, ethylene carbonate, tetramethylsulphone or hexamethylphosphoramide.

EXAMPLE 2

79 g of chromium nitrate $Cr(NO_3)_3.9H_2O$ were dissolved in 0.8 liter of dimethylformamide. 58.5 cc of acetylacetone were then added. The mixture was heated for 15 to 20 minutes at a temperature of 50°C. Heating was then stopped and during cooling of the solution 52.8 g of ferric chloride $FeCl_3.6H_2O$ were dissolved and 58.5 cc of acetylacetone were added.

169 g of bivalent cobalt acetate $Co(CH_3COO)_2.4H_2O$ and 23 cc of acetylacetone plus 34.9 cc of $H_2O_2$ were then added to the resulting solution. The hydrogen peroxide served to convert the bivalent cobalt to trivalent cobalt. The solution was agitated with cooling for about 15 minutes. Dimethylformamide was added to make up 1 liter of solution. The resulting solution had a total oxides concentration of 85.1 g/liter of solution divided up as shown by the following percentage by weight:

64.1% $Co_2O_3$
18.4% $Fe_2O_3$
17.5% $Cr_2O_3$

This solution was then sprayed on to a glass ribbon 4 mm thick made in the same way as in Example 1. The temperature of the glass during the spraying operation was 600°C.

The equipment used for spraying was the same as in Example 1.

The gun output was 13.8 liters of solution per hour.

The coating deposited had a uniform thickness of 800 A and had a bronze tint when viewed in transmitted light.

The oxides composition in the coating was, by weight,

12% $Fe_2O_3$
18% $Cr_2O_3$
70% $Co_3O_4$

The light transmission was 47.1%
The energy transmission was 51.3%

When the thickness of the coating was increased to 1200 A, a more yellowish tint was obtained when viewed in transmitted light.

In that case the light transmission was 36.7% and the energy transmission was 42.6%.

The coating obtained had sufficient hardness for use as single glazing and also had excellent resistance to external conditions, including acids.

The same operation was repeated on printed glass while it was at a temperature of 640° during production. A coating of oxides of a thickness of 540 A was deposited on this glass using identical spray equipment to that described above. The solution delivery was 16.1 liters per hour and the glass speed of movement was 3.15 meters per minute (ribbon width 2 meters).

EXAMPLE 3

113.5 g of zirconium chloride $ZrCl_4$ were dissolved in 0.8 liter of dimethylformamide. The solution was then made up to 1 liter to have a concentration equivalent to 60 g of $ZrO_2$ per liter of solution. This solution had a yellowish tint and was cloudy.

This solution was then sprayed on to a sheet of glass at a temperature of 600°c. The resulting coating was of a grey tint and had a number of small bright spots.

The same test was repeated but with the addition of acetylacetone to the starting solution, the proportion of acetylacetone being 4 moles to 1 mole of $ZrCl_4$. The amount of acetylacetone added was 195 cc. After heating to 50° for about 15 minutes the solution became perfectly clear.

When this solution was sprayed on to the sheet of glass the resulting film was perfectly uniform and grey when viewed in transmitted and reflected light.

The characteristics of the resulting product were as follows:
Light transmission 73.8%
Energy transmission 74%
Light reflection on coating side 22.8%
Energy reflection on coating side 18.2%
The resulting coating was very hard.

EXAMPLE 4

A number of film-forming solutions were prepared by dissolving the metallic salt corresponding to the desired oxide in an appropriate solvent. The solutions, which are shown in the Table below, were sprayed on to a sheet of glass 4 mm thick heated to a temperature of 600°C. The characteristics of the resulting product are shown in Table 1.

A fourth solution was prepared by initially dissolving $SnCl_4$ in acetylacetone to give a very viscous red liquid which was then dissolved in dimethylformamide.

These four solutions had an identical tin content and were sprayed on a sheet of glass at a temperature of 580°. The coatings obtained from the four solutions were indentical optically. Their tint was green in reflected light in all four cases.

EXAMPLE 6

A film-forming solution was prepared by dissolving 400 g of stannous chloride $SnCl_2.2H_2O$ and a small quantity of antimony chloride, i.e., 7.5 g of $SbCl_3$, in 1 liter of dimethylformamide.

This solution was sprayed at a rate of flow of 15.8 liters per hour onto the smooth surface of a printed glass ribbon moving at a speed of 3.5 meters per minute, just upstream of the annealing gallery, at a place where the temperature of the glass was of the order of

TABLE 1

| Starting Salt | Solvent | Composition of Film | Thickness of film | Properties of the film and of the product obtained |
|---|---|---|---|---|
| $Mg(CH_3COO)_2$ | DMSO | MgO | 400 A | Light transmission 79.3% Energy transmission 77.4% |
| $BiCl_3$ (+Acac) | DMF | $Bi_2O_3$ 50% | 700 A | Yellow when viewed in transmitted light after assembly |
| $VCl_3$ (+Acac) | | $V_2O_3$ 50% | | in double glazing: Light transmission 57.6% Energy transmission 59.5% (The film was disposed on the inner surface of the outer glass |
| $Cd(CH_3COO)_2.2H_2O$ | DMF | CdO | 400 A | Light transmission 79.3% Energy transmission 77.4% |
| $WCl_6$ | acetonitrile | $WO_3$ 80% | 500 A | Grey tint in transmitted and reflected light |
| $MoCl_3$ | | $Mo_2O_3$ 20% | | Light transmission 67.7% Energy transmission 70% |
| $Pb(CH_3COO)_2$ (+5cc/literHAc) | DMF | PbO 60% | 500 A | Grey-brownish tint in transmitted light |
| $Mn (NO_3)_2.6H_2O$ | | $MnO_2$ 40% | | Light transmission 67.7% Energy transmission 71.3% |
| $AuCl_3$ | DMF | Au 14.95% | 650 A | The effect of the presence of $Rh_2O_3$ is to limit the dimensions |
| $ThCl_4$ (+Acac) | | $ThO_2$ 70% | | of the particles of Au. Film of blue tint in transmitted |
| $TiCl_4$ (+Acac) | | $TiO_2$ 15% | | light. After assembly as double glazing the following values |
| $RhCl_3$ | | $Rh_2O_3$ 0.05% | | were obtained: Light transmission 57.1%, Light reflection 17.2%, Energy absorption 28.9%, Energy transmission 56.2%, Energy reflection 14.9% |
| $FeF_3$ (+Acac) | dimethyl-acetamide | $Fe_2O_3$ 75% | 550 A | Yellow-amber tint in transmitted |
| $CrBr_3$ | | $Cr_2O_3$ 25% | | light, yellow in reflected light Light transmission 52.5% Energy transmission 54.6% |
| $Zr (NO_3)_4.5H_2O$ (+Acac) | DMF | $ZrO_2$ 60% | 600 A | Brown tint in transmitted light Light transmission 56.7%, |
| $Ni(NO_3)_2.6H_2O$ (+Acac) | | NiO 10% | | Light reflection 29.5%, Energy absorption 14.3%, |
| $Cu(CH_3COO).H_2O$ | | CuO 30% | | Energy transmission 63.7%, Energy reflection 22% |
| $CeCl_3$ (+Acac) | DMF | $Ce_2O_3$ 85% | 400 A | Grey tint in transmitted and reflected light |
| $Al(NO_3)_3.9H_2O$ (+Acac) | | $Al_2O_3$ 15% | | Light transmission 71.2% Energy transmission 72.5% |
| $SnCl_4.5H_2O$ | DMF | $SnO_2$ 90% | 700 A | Pink tint in transmitted light Light transmission 71.8% |
| $AsCl_3$ | | $As_2O_3$ 10% | | Energy transmission 69.1% |

DMSO = dimethylsulphoxide    DMF = dimethylformamide    Acac = acetylacetone
Hac = acetic acid

Example 5

Tin oxide coatings were prepared by spraying solutions of tin chloride in dimethylformamide.

3 solutions were prepared by dissolving the following respectively in dimethylformamide: $SnCl_2$; $SnCl_2.2H_2O$; $SnCl_4.5H_2O$.

680°C. The total width of the ribbon was 1.57 m. The gun was reciprocated over a distance of 1.27 m. The number of sweep cycles was 25 per minute.

A coating having a uniform purple tint was obtained over a width of 1.10 m. The thickness of the coating was 2700 A. The electrical resistance of the coating was 60 Ω/□ . A piece of glass 30 × 30 cm was cut from this ribbon and subjected to thermal hardening. Silver varnish electrodes were then applied. With the application of a voltage of 220 V the temperature a few millimeters above the glass was 92°C. If a coating of less thickness is deposited, i.e., 200 to 800 A, the same starting solution yields an antistatic coating which is no longer electrically conductive.

It was also possible to obtain antistatic coatings by spraying on the glass a film-forming solution containing from 70 to 90% by weight of $SnCl_4$ and 30 to 10% by weight of $SnCl_2$.

EXAMPLE 7

Stannic chloride $SnCl_4$ was dissolved in acetylacetone and then the resulting liquid was dissolved in dimethylformamide and ferric chloride $FeCl_3.6H_2O$ was added thereto.

Different solutions containing different proportions of stannic salt and ferric salt were sprayed on to a glass heated to 550°C.

The oxides concentration was always 60 g per liter and the thickness of the film was of the order of 500 A.

The following table gives the characteristics of the films obtained and of the solutions used:

| Percentage in the solution | $SnO_2$ | 0 | 10 | 20 | 30 | 40 | 100 |
|---|---|---|---|---|---|---|---|
| | $Fe_2O_3$ | 100 | 90 | 80 | 70 | 60 | 0 |
| Percentage in the film | $SnO_2$ | 0 | 25 | 41 | 64 | 79 | 100 |
| | $Fe_2O_3$ | 100 | 75 | 59 | 36 | 21 | 0 |
| Light transmission (%) | | | 50.3 | 55.2 | 60.1 | 65.6 | 71.1 | 76.8 |
| Tint | | | Pronounced yellow amber | Amber grey | Amber | Yellowish grey | Grey | Pale grey |

The solution was sprayed onto a glass heated to 500°C and gave a coating of the order of 1200 A thickness.

The coating was of a blue tint in reflected light and slightly yellowish in transmitted light.

Light transmission 87.2%
Energy transmission 79.5%
Electrical resistance 70Ω/□

A coating of this kind may be used as a glazing for heating purposes. It was found that the addition of a small quantity of acetylacetone to the film-forming solution (i.e., ⅓ mole of acetylacetone to 1 mole of $InCl_3.4H_2O$) improved the optical quality of the film and that it was possible to obtain films with an electrical resistance of 25Ω/□ and even less.

EXAMPLE 10

A spraying solution was prepared by diluting silicon chloride $SiCl_4$, to which acetylacetone had been added, in dimethylformamide.

The solution was sprayed onto a sheet of glass heated to 500°C to form a very thin film of $SiO_2$ of the order of 150 A thick.

In indium oxide coating identical to that indicated in Example 9 was then deposited on the glass coated in this way.

The optical and electrical properties of the coating were similar to those obtained in Example 9, the quality and uniformity of the coating being particularly high.

It will be understood that this invention is susceptible to modification in order to adapt it to different usages and conditions, and accordingly, it is desired to comprehend such modifications within this invention as may fall within the scope of the appended claims.

What is claimed is:

1. In a method of forming a metallic oxide coating on a substrate by applying at least one metal compound to the substrate and thermally converting said compound to a metal oxide coating, the improvement comprising the steps of applying to the substrate by spraying a solution of one or more metallic salts selected from the group of the acetates, halides and nitrates dissolved in an aprotic solvent having a dielectric constant greater than 15 and a dipolar moment greater than 3D, and subjecting the resultant substrate to heat sufficient to convert the metallic salt in situ to form a coating comprising at least one metallic oxide.

2. A method according to claim 1 wherein preheating the substrate to a sufficiently high temperature such as to provide the heat to effect the conversion of the metallic compound.

3. A method according to claim 2 wherein the substrate surface to be coated reaches a temperature between 300° and 700°C.

4. A method according to claim 1 wherein the solution is applied in the form of droplets.

EXAMPLE 8

75.5 g of anhydrous $SnCl_2$ and 15 g of $SbCl_3$ were dissolved in 1 liter of dimethylformamide. The solution was sprayed onto a sheet of glass to form a coating with a thickness of the order of 2000 A.

The coating had a very intense blue tint when viewed in transmitted light.

Light transmission of the order of 21%.
Light reflection 5%

By adjusting the concentration of $SbCl_3$ it was possible to vary the intensity of the blue tint and also the resistance of the coating. This is illustrated by the drawing in which the curve 1 represents the light transmission of a film of oxides comprising $SnO_2$ and $Sb_2O_3$ against the quantity of $SbCl_3$ present in the film-forming solution and curve 2 represents the electrical resistance of the film against the quantity of $SbCl_3$ present in the film-forming solution.

The curves 1 and 2 were plotted from the following data: the light transmission of the film of a thickness of 700 A (as a percentage) was plotted on the left-hand ordinate and the electrical resistance in Ω/□ was plotted to a logarithmic scale on the right-hand ordinate. The abscissa represents the number of grams of $SbCl_3$ added to a liter of solution containing 75.5 g of anhydrous $SnCl_2$.

EXAMPLE 9

127 g of indium chloride $InCl_3.4H_2O$ were dissolved in 1 liter of dimethylformamide. 1.58 g of $SnCl_2$ were added thereto (to give 2% of metallic Sn with respect to the metallic In content).

5. A method according to claim 1 wherein the solvent consists of dimethylformamide.

6. A method according to claim 1 wherein the solvent is dimethylformamide, tetramethyl urea, dimethylsulphoxide, acetonitrile, nitribenzene, ethylene carbonate, tetramethylene sulphone, or hexamethylphosphoramide.

7. A method according to claim 1 wherein the solution applied to the substrate comprises one or more acetates, halides or nitrates of a metal or a plurality of metals of Mg, Zr, V, Cr, W, Mn, Fe, Co, Ni, Cu, Zn, Cd, In, Sn, Pb, Bi, Th, or Si.

8. A method according to claim 1 wherein the solution applied to the substrate comprises one or more acetates, halides or nitrates of a metal or of a plurality of metals of Mg, Zr, V, Cr, W, Mn, Fe, Co, Ni, Cu, Zn, Cd, In, Sn, Pb, Bi, Th, or Si, in mixture with one or more acetates, halides or nitrates of a metal or of a plurality of metals selected from the group: Au, Ti, Ce, Mo, Sb, Al, As, or Rh.

9. A method according to claim 1 wherein acetylacetone is added to the solution.

10. A method according to claim 9 wherein the proportion of acetylacetone is such that the quantity of acetylacetone is of the order of $n$ times the number of moles of metallic salt used where $n$ represents the valence or the aggregate of the valences of the metallic cations.

11. A method according to claim 1 wherein the substrate is at least partially vitreous.

12. A method according to claim 11 wherein the formed metallic oxide coating is transparent to light.

13. A method according to claim 1 wherein the substrate is in the form of a continuous ribbon of flat glass.

14. A method according to claim 13 wherein the solution is applied to the glass ribbon at a place where the temperature of said ribbon is between 450° and 650°C.

15. A method according to claim 1 wherein the solution is formed wholly or in part from one or more tin chlorides hydrated or anhydrous.

16. A method according to claim 15 wherein the formed oxide coating has antistatic properties.

17. A method according to claim 16 wherein the coating has a thickness of the order of 200-800 A.

18. An article of manufacture comprising a substrate having a metallic oxide coating thereon formed by applying to the substrate a solution of one or more metallic salts selected from the group of the acetates, halides and nitrates in an aprotic solvent having a dielectric constant greater than 15 and a dipolar moment greater than 3D, and subjecting the substrate and applied solution to heat to convert the metallic salt in situ to form a coating comprising at least one metallic oxide.

19. An article of manufacture as claimed in claim 18 wherein said substrate is vitreous or partially vitreous.

20. An article of manufacture as claimed in claim 18 wherein said substrate is nonvitreous.

* * * * *